June 21, 1949.  B. F. WHEELER  2,473,625
MOTION-PICTURE CONTINUOUS FILM EDITING SYSTEM
Filed Nov. 30, 1946
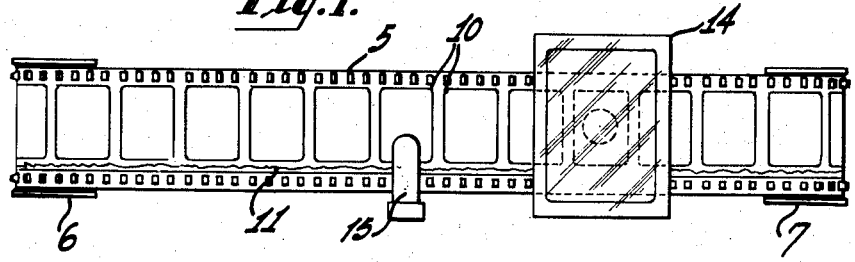
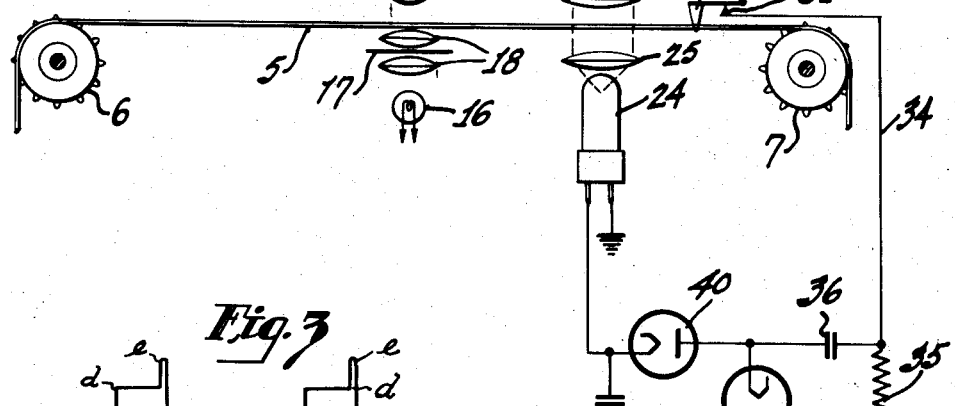
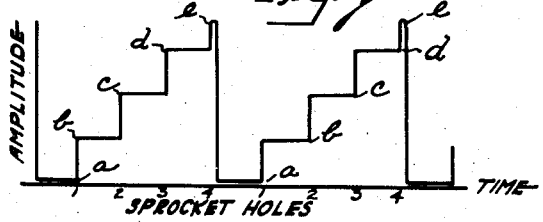
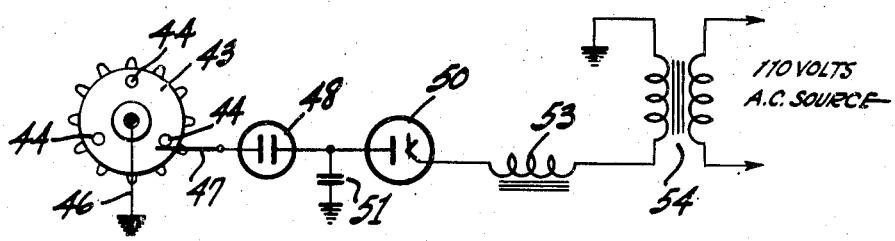
INVENTOR.
Benjamin F. Wheeler
BY Patented June 21, 1949

2,473,625

UNITED STATES PATENT OFFICE 2,473,625

MOTION-PICTURE CONTINUOUS FILM EDITING SYSTEM

Benjamin F. Wheeler, Haddonfield, N. J., assignor to Radio Corporation of America, a corporation of Delaware Application November 30, 1946, Serial No. 713,247

5 Claims. (Cl. 88—16.8)

This invention relates to motion picture apparatus, and particularly to a film editing system of the continuous film type.

Motion picture film editing devices are well-known, particularly those wherein the film is intermittently passed between a source of light and a viewing screen. In such devices, film reels may be used or the film may be passed from one basket to another, inasmuch as the film is viewed or reproduced in short lengths. The present invention provides an editing device of this type, but one through which the film is advanced at a continuous rate, thus reducing film wear and simplifying the film driving mechanism. The principal feature of the invention is the provision of an intermittent light source instead of an intermittent film advancing mechanism. The light source is of the flash or stroboscopic lamp type, the lamp being triggered by every fourth sprocket hole or by a sprocket switch contact.

Since some film being edited may be a composite and contain a sound track, the editing device of the invention also provides a sound reproducing portion in combination with the picture viewing portion. Furthermore, the invention may be embodied in a projection system for direct viewing or in a system for projection onto a television pickup tube.

The principal object of the invention, therefore, is to facilitate the editing of motion picture film.

Another object of the invention is to provide an improved system of editing motion picture film.

A further object of the invention is to provide a simplified editing device through which the film may be advanced at a constant speed.

A still further object of the invention is to provide an improved editing system both for the picture and sound on a motion picture film.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a plan view of the film being edited and the viewing screen.

Fig. 2 is a diagrammatic view of the editing device embodying the invention.

Fig. 3 is a chart illustrating the operation of the counting circuit shown in Fig. 2, and Fig. 4 is a modification of the trigger section of the system.

Referring now to the drawings, in which the same numerals identify like elements, a film 5 is shown between two sprockets 6 and 7 which may be driven at a continuous speed in any well-known manner. The film 5 has picture frames 10 and sound track 11. Positioned above the film, in viewing position, is an observation screen 14 and photoelectric pickup cell 15. Light from a lamp 16 is defined into a slit by a mask 17 and projected on the film 5 by a pair of lenses 18. After modulation by the sound track, it is picked up by the cell 15, amplified by the amplifier 20, and reproduced by a loud speaker 21. The necessary film supporting gates will be provided.

The pictures in the frames 10 are projected by a lens 23 to the screen 14, the projection light being obtained from a flash lamp source 24 after projection by a lens 25. The lamp 24 may be of the 1D21 Strobotron type. In the usual type of picture projection systems, the source of light is steady or continuous and the film intermittently positioned between the lamp source and screen, a shutter intercepting the light beam during the time the film is moving. In the present invention, the film is driven at a constant speed between the lenses 23 and 25 and the lamp 24 is lighted only at the instant the picture frame is in the proper position between the lenses. Since the observation screen 14 is small, a high intensity light source is not required, and the quality of the picture need only be sufficient for editing purposes.

To flash the lamp 24 at the proper instant, reference is now made to the remaining portion of the system shown in Fig. 2. An insulated roller or sliding contact switch blade 30 rides along the sprocket hole area of the film, contact being made with the element 30. However, since there are four sprocket holes per frame of 35 mm. film, the lamp 24 should only be energized or flashed every fourth sprocket hole. This is accomplished by the counting circuit, now to be described. The switch elements 30—31 are connected in a circuit over conductors 33 and 34 and a resistor 35. The resistor 35 is paralleled by a condenser 36 and a diode 37. The condenser 36 is charged through resistor 35 from a negative supply voltage, as shown, the closure of elements 30—31 discharging a portion of the charge on condenser 36 into a condenser 39 through a diode 40, which raises the voltage on condenser 39. When the contact at 30—31 is broken, condenser 36 recharges through diode 37. The voltage across condenser 39 thus builds up in steps, and, with the proper circuit constants, the voltage across condenser 39 will reach the discharge voltage of the gas tube or lamp 24 every fourth closure of elements 30—31. The condenser 39 then discharges through lamp 24 and produces a light at the instant the picture frame is properly positioned between the lenses 23 and 25. If desired, the discharge of condenser 39 may be impressed on the grid of a lamp such as one of the 1D21 type controlling an external discharge current source.

The manner in which the voltage across condenser 39 is built up is shown in Fig. 3, wherein the first sprocket hole increases the voltage on condenser 39 from point $a$ to point $b$. The second sprocket hole increases the voltage on condenser 39 from point $b$ to point $c$; the third sprocket hole increases the voltage from point $c$ to point $d$; and the fourth sprocket hole increases the voltage from point $d$ to point $e$ which is the discharge point for the lamp 24. Thus, as the film is passed between the lenses 23 and 25, the lamp 24 will illuminate the film at every fourth sprocket hole, and the image of the pictures on the film may be observed on the screen 14 as the film is continuously advanced by the sprockets 6 and 7. This continuous film motion, of course, permits sound to be reproduced therefrom by the reproducing section of the device.

Framing, if required, can be provided by moving the position of contacts 30—31 along the film, or even more simply by merely locating the film properly before starting its motion.

Referring now to Fig. 4, another system of producing illumination of the film at the proper instant is illustrated. In this embodiment, the sprocket 43 may be either sprocket 6 or 7 of Fig. 2, but it has positioned at the ends thereof, spaced four sprocket teeth from each other, three contact pins 44. These pins are grounded through the sprocket over conductor 46. Adapted to contact the pins 44 every fourth sprocket hole is a brush 47 connected to a flash lamp 48 which may be of the type shown at 24 in Fig. 2. Flash lamp 48 is connected to the anode of a diode 50 and to a condenser 51, the diode 50 being energized over a choke coil 53 connected to the secondary of a transformer 54, which is supplied with energy from any suitable 110-volt alternating current source. This circuit operates substantially in the same manner as in Fig. 2, except that the condenser 51 is charged to the discharge voltage of lamp 48 through the diode 50 and is discharged through lamp 48 only when the brush 47 makes contact with the pin 44. Since the pins 44 are positioned every fourth sprocket tooth on the sprocket 43, the lamp 48 will flash at the proper instant to illuminate the film for projection of the picture frames to the screen 14.

It is, of course, understood that only standard 35 mm. motion picture film has four sprocket holes per picture frame and to adapt the invention to other width film, such as 16 mm. film, it would be necessary to have as many contact pins 44 as there are sprocket teeth, since there is one sprocket hole per picture frame on 16 mm. film. Thus, 16 mm. film could be edited in the system of Fig. 2 without the counting circuit.

I claim:

1. A film editing system comprising a film having picture frames thereon, means for advancing said film at a substantially uniform speed, an observation medium on one side of said film, a lamp on the other side of said film, and means controlled by said moving film for energizing said lamp only at the instances said picture frames are positioned between said lamp and observation medium, said last mentioned means including a switch operated by the sprocket holes in said film and a counting circuit for controlling the energization of said lamp after the passage of a predetermined number of sprocket holes through said switch, said circuit including a pair of condensers, one condenser being discharged by each closure of said switch.

2. A film editing system comprising a film having picture frames thereon, means for advancing said film at a substantially uniform speed, an observation medium on one side of said film, a lamp on the other side of said film, and means controlled by said moving film for energizing said lamp only at the instances said picture frames are positioned between said lamp and observation medium, said last mentioned means including a switch making contact as each sprocket hole passes therethrough and an electronic circuit connected to said switch and said lamp for energizing said lamp at predetermined sprocket holes, said circuit including a pair of condensers, one condenser being discharged upon each contact of said switch.

3. A film projector comprising a motion picture film having picture frames thereon and openings therethrough, means for advancing said film at a substantially constant speed, a medium for observing images of the pictures on said film, a light source, switch means making contact for each opening in said film, and an electronic counting means for intermittently energizing said light source in accordance with the position of each of said picture frames and said openings with respect to the positions of said light source and said medium, said counting means including a pair of condensers, one of said condensers being discharged by each closure of said switch.

4. A film projector comprising a motion picture film having picture frames thereon, means for advancing said film at a substantially constant speed, a medium for observing images of the pictures on said film, a light source, and means for intermittently energizing said light source in accordance with the position of each of said picture frames with respect to the positions of said light source and said medium, said last mentioned means including an electronic counting circuit for energizing said light source, and switch means for controlling the time of energization of said counting circuit, said counting means including a pair of condensers, one of said condensers being discharged by each closure of said switch.

5. A film projector comprising a motion picture film having picture frames thereon, means for advancing said film at a substantially constant speed, a medium for observing images of the pictures on said film, a light source, and means for intermittently energizing said light source in accordance with the position of each of said picture frames with respect to the positions of said light source and said medium, said last mentioned means including an electronic counting circuit for energizing said light source, and switch means making contact for each sprocket hole in said film, said counting circuit determining the time of energization of said light source by said circuit, said circuit including a pair of condensers, one condenser being discharged upon each contact of said switch.

BENJAMIN F. WHEELER.

REFERENCES CITED

The following references are of record in the file of this patent:

UNITED STATES PATENTS

| Number | Name | Date |
|---|---|---|
| 1,921,469 | Kuhn et al. | Aug. 8, 1933 |
| 1,940,151 | Serrurier | Dec. 19, 1933 |
| 2,262,051 | Sabol et al. | Nov. 11, 1941 |

FOREIGN PATENTS

| Number | Country | Date |
|---|---|---|
| 364,302 | Great Britain | Jan. 7, 1932 |
| 105,956 | Switzerland | Nov. 1, 1924 |